United States Patent Office 3,305,757
Patented Feb. 21, 1967

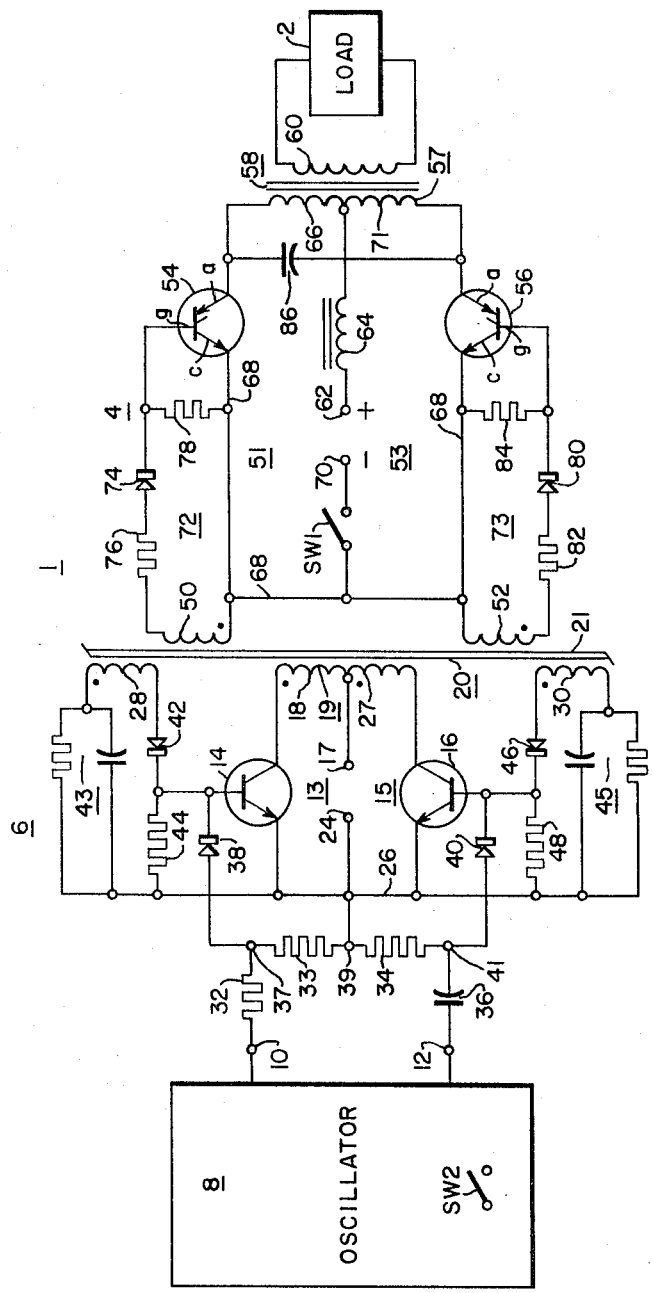

3,305,757
POWER INVERTING NETWORK UTILIZING THYRATRONIC SWITCHES CONTROLLED BY A SATURABLE TRANSFORMER
Leland A. Schlabach, Wilkins Township, Allegheny County, and George W. Nagel, Forest Hills Boro, Pa., assignors to Westinghouse Electric Corporation, East Pittsburgh, Pa., a corporation of Pennsylvania
Filed Oct. 22, 1962, Ser. No. 232,059
2 Claims. (Cl. 321—16)

This invention relates generally to networks for inverting direct current into alternating current and more particularly to such a network which utilizes valve devices of the controlled rectifier type in which the initiation of conduction through the valve device is controlled in accordance with a signal but which when rendered conductive will continue to conduct until means external to the valve device operates to terminate the current flow therethrough.

An object of this invention is to provide a pulse generating system for rendering these valves conducting.

Another object of this invention is to provide such a system which is of extremely high efficiency.

Other objects of this invention will be apparent from the description, the appended claims and the drawing, the sole figure of which illustrates schematically an inverter embodying the invention.

Referring to the drawing by characters of reference, the numeral 1 indicates generally an inverter network for energizing an alternating current load device 2. The inverter network comprises a power controlling section 4, a pulse producing section 6 and an oscillator 8 which determines the frequency of the alternating potential supplied to the load 2. The oscillator may be of any type providing an alternating potential between its output terminals 10 and 12. Preferably, the oscillator 8 is of the type which has a square wave output and may be an oscillator such as that shown in United States Patent 2,962,667, dated November 29, 1960.

The pulse producing section 6 comprises a pair of current paths 13 and 15 controlled by a pair of transistor valve deviecs 14 and 16, respectively. The path 13 extends from a positive potential terminal 17 of a direct current source of electrical energy (not shown) through the upper half 18 of a center tapped primary winding 19 of a transformer 20, the collector and emitter of the transistor 14 and a common bus 26 to the negative input terminal 24. Similarly, the path 15 extends from the positive input terminal 17, the lower half 27 of the winding 19, the collector and emitter of the transistor 16, and the bus 26 to the negative terminal 24.

The core 21 of the transformer 20 is of the saturating type and further is preferably of the type having a substantially rectangular hysteresis loop. It is preferably proportioned relative to the winding 19 so that it will saturate in a short time; not substantially greater than the time interval required to insure firing of the controlled rectifiers of the power controlling section 4.

Each of the transistors 14 and 16 is rendered conducting and non-conducting by controlling the base drive applied between its base and emitter by means of a pair of control circuits. One of these control circuits is energized by the oscillator to initiate conduction of the transistors 14 and 16 alternately. The other control circuit is energized from the feedback windings 28 and 30 of the transformer 20 to maintain the conducting transistor fully conductive until the core of the transformer 20 saturates at which time the conducting transistor will become nonconducting.

The conducting initiating control circuit is connected between the output terminals 10 and 12 of the oscillator 8 and comprises first, second and third resistors 32, 33 and 34 and a capacitor 36 connected in series. One terminal 37 of the resistor 33 (adjacent the resistor 32) is connected through a diode 38 to the base of the transistor 14. The common connection 39 of the resistors 33 and 34 is connected through the common emitter bus 26 to the emitters of the transistors 14 and 16. The terminal 41 of the resistor 34 (adjacent the capacitor 36) is connected to the base of the transistor 16 through a diode 40. With this arrangement a conducting bias voltage will be applied to the transistors alternately.

The feedback control circuit for the transistor 14 comprises the winding 28, one terminal of which is connected to the base of the transistor 14 through a diode 42 and the other terminal of which is connected through a biasing network 43 (comprising a resistor and a capacitor parallelly connected together) to the emitter of the transistor 14 through the common bus 26. A resistor 44 is shunt connected between the base and emitter of the transistor 14 to stabilize operation of the feedback circuit. Similarly, the feedback control circuit for the transistor 16 comprises the winding 30, one terminal of which is connected to the base of the transistor 16 through a diode 46 and the other terminal of which is connected through a biasing network 45 (comprising a resistor and a capacitor parallelly connected together) to the emitter of the transistor 16 through the common bus 26. A shunt resistor 48 similar to the resistor 44 is connected between the base and emitter of the transistor 16. With this arrangement the transistors 14 and 16, once they have been rendered conductive will be maintained fully conductive for the time interval required to saturate the core 21.

When the core saturates, the drive power for the conducting transistor is removed and the transistor becomes non-conductive allowing the flux in the core 21 to return to its residual value. The return of the flux from its saturating value to its residual value induces a voltage into the control circuit of the transistor which was previously non-conductive in a direction tending to render this last-named transistor conducting. Rendering of this transistor conductive at this time is prevented due to the forward voltage drop of the diode in its base circuit. If desired, a source of blocking bias voltage could be substituted for the diode.

The power controlling section 4 is provided with a pair of power conducting paths 51 and 53 controlled by a pair of valve devices 54 and 56 (which are of the discontinuous control type and may be semiconductor controlled rectifiers) and may be termed a thyratronic power switch. The switch 4 controls the alternate polarity energization of a center tapped primary winding 57 of an output transformer 58. An output winding 60 of the transformer 58 is connected to energize the load 2. The first path 51 extends from the positive terminal 62 of a suitable source of direct potential energy (not shown) through an inductive reactor 64, the upper half 66 of the center tapped primary winding 57, the anode $a$ and cathode $c$ of the valve device 54, common cathode bus 68, and switch SW1 to the negative terminal 70 of the energy source. Similarly, the path 53 extends from the terminal 62 through the reactor 64, the lower half 71 of the winding 57, anode $a$ and cathode $c$ of the valve device 56, bus 68 and switch SW1 to the negative source terminal 70. The commutating capacitor 86 is connected between the anodes of valve devices 54 and 56 so as to stop the flow of current through one valve device when the alternate valve device is turned on.

The control circuits 72 and 73 of the valves 54 and 56 are energized from secondary windings 50 and 52 of the transformer 20. The gate $g$ of the device 54 is connected through a rectifier 74 and a current limiting resistor 76 to one terminal of the winding 50, the other terminal of which is connected to the cathode c of the device 54 through the common bus 68. A resistor 78 is connected between the gate g and cathode c of the valve 54. Similarly, the gate g of the valve 56 is connected through a rectifier 80 and a resistor 82 to one terminal of the secondary winding 52, the other terminal which is connected through the common bus 68 to the cathode c of the valve device 56. A resistor 84 is connected between the gate g and the cathode c of the valve 56.

It is believed that the remainder of the apparatus may best be described by a description of operation thereof which is as follows: Upon closure of the start switch SW2 of the oscillator 8 alternating potential is applied between the output terminals 10 and 12 thereof. Assuming that this occurs at an instant in which the terminal 10 is going positive with respect to the terminal 12, current will flow from terminal 10 through the resistors 32, 33, and 34, and the capacitor 36 to terminal 12 thereby charging the capacitor 36. During the flow of charging current to the capacitor 36, a potential will be established across the resistor 33 at a polarity to provide a conducting pulse through the rectifier 38 to the transistor 14 which thereupon becomes conducting. Rectifier 42 is provided to block the shunting path around the base to emitter of transistor 14. This shunting path is comprised of the feedback winding 28 and the biasing network 43. Conduction of the transistor 14 energizes the path 13 whereby the upper half 19 of the winding 18 causes flux to build up in the core 21 of the transformer 20. This causes a voltage to be induced in the windings 28, 30, 50 and 52. The voltage induced in the winding 50 acts to render the thyratronic switch device 54 conducting. The device 54 may take the form of a semiconductor controlled rectifier. When device 54 conducts, current flows in the power path 51 causing a change in flux in the core of the transformer 58 energizing its secondary winding 60 to supply power to the load 2. The potential established in the winding 52 because of its polarity is ineffective to render the thyratronic switch device 56 conducting and this device remains in its non-conductive state.

The voltage induced in the winding 28 during the conduction of the current through the winding 18 and prior to saturation of the core 21 is of a polarity which energizes the base of the transistor 14 positive with respect to the emitter. This potential, therefore, acts to maintain the transistor 14 in its fully conductive condition. It will be noted that the rectifier 42 is polarized to permit this current flow.

The time constant of the capacitor 36 and the resistors 32, 33, and 34 is preferably short and need be only long enough to insure initial conduction of one of the transistors 14 and 16. At a 400 cycle frequency of the oscillator 8, 20 microseconds is sufficient. The core 21 of the transformer 20 is proportioned so that it saturates after the valve device 54 or 56 has been rendered conducting. A time interval of 50 microseconds has been found sufficient. The core of the transformer 58 is designed with sufficient material so that the core will not saturate during normal operating intervals of the devices 54 and 56.

It will be appreciated that since the half-period of the oscillator 8 is substantially greater than the time required for saturation of the core 21 power is supplied to the pulse producing units for only a fraction of the half cycle periods thereby reducing the pulse power loss and reducing the heat dissipation problem.

When the oscillator reverses its output polarity, its output terminal 12 becomes positive with respect to its terminal 10 and current flows through the resistors 32, 33, and 34 in the reverse direction to supply a conducting pulse to the transistor 16 which thereupon begins to conduct to energize the lower half 27 of the primary winding 18. Flux builds up in the core 21 in a direction opposite to the direction which occurred when the transistor 14 conducted. This results in a reversal of the potential developed in the secondary windings 28, 30, 50 and 52 whereby the winding 52 will become effective to render the valve device 16 conducting and the winding 30 will provide a feedback voltage to the control circuit of the transistor 16 to maintain this transistor in its fully conductive condition until the time that the core 21 saturates whereupon further feedback voltage from the winding 30 will cease and the transistor 16 will become non-conducting.

Energization of the winding 52 renders the device 56 conducting. When this occurs, the commutating capacitor 86 extinguishes the valve device 54. This rendering of the device 56 conducting and the valve device 54 non-conducting causes current to flow in the path 53 to build up flux in the core of the transformer 58 in a direction opposite to the direction above when the valve 54 conducted to induce a potential in the secondary winding 60 for energizing the load 2 in the opposite polarity.

The valve 56 will continue to conduct and potential will be supplied to the load 2 in this reverse polarity until such time as the oscillator again reverses the energization of its output terminals 10 and 12 at which time the transistor 14 will become conducting to supply an energizing pulse for rendering the valve device 54 conducting. When the valve device 54 reconducts it will operate through the commutating capacitor 86 to render the valve 56 non-conducting whereby current will flow in the upper half of the primary winding 66 to energize the secondary winding 60 and the load 2 as above described with respect to conduction of the valve 54. The inverter network 1 will continue to supply alternating polarity potential to the load 2 from the input terminals 62 and 70 in the fashion above described until such time as the power controlling switch SW1 is opened.

Although the invention has been described with reference to a certain specific embodiment thereof numerous modifications are possible and it is intended to cover all modifications falling within the spirit and scope of the invention.

What is claimed and is desired to be secured by United States Letters Patent is as follows:

1. An inverter network, a first pair of source terminals adapted to be energized with direct voltage, a pair of load terminals, first and second thyratronic switches, each said switch having a power path and a control device for rendering said power path conductive, a first power conveying path interconnecting said source terminals and said load terminals and including said power path of said first switch, a second power conveying path connected to said load terminals and including said power path of said second switch, a transformer having a primary winding means and a secondary winding means and a tertiary winding means, said transformer further including a magnetic material core having a hysteresis loop of substantially rectangular configuration linking said winding means, means connecting said secondary winding means to said control devices in such polarity that a flux change in said core in a first direction toward a first saturated condition of said core will actuate said control device of said first switch to render said power path of said first switch conductive and that a flux change in said core in a second direction toward a second saturated condition of said core will actuate said control device of said second switch to render said power path of said second switch conductive, a second pair of source terminals adapted to be energized with direct voltage, first and second valve devices, each said valve device having a power conveying path and a control path for controlling the initiation and termination of current flow through its said power path, a pair of current paths connecting said primary winding means to said second pair of source terminals, a first of said current paths including said power path of said first valve device and effective when conducting to change said flux in said first direction, a second of said current paths including said power path of said second valve device and effective when conducting to change said flux in said second direction, a pair of bias voltage producing devices, feedback means connecting said tertiary winding means to said control paths of said valve devices and including said bias devices, said feedback means being polarized such that a change in said flux in said first direction renders said control path of said first valve device effective to maintain its said power path conductive and a change in said flux in said second direction renders said control path of said second valve device effective to maintain its said power path conductive, a first of said bias devices being in circuit with said control path of said first valve device and effective to oppose actuation of its said control path, the second of said bias devices being in circuit with said control path of said second valve device and effective to oppose actuation of its said control path, a source of spaced periodic electrical pulses of alternating polarity, the time interval between said pulses of said source being substantially greater than a second interval, said second interval being the interval required to change the flux in said core from a residual flux following saturation in one of said directions to saturation in the other of said directions, the length of each said pulse of said source being substantially less than said second interval, and means connecting said last-named source to said control paths of said valve devices whereby said valve devices are alternately rendered conductive.

2. An inverter network, a first pair of source terminals adapted to be energized with direct voltage, a pair of load terminals, first and second thyratronic switches, each said switch having a power path and a control device for rendering said power path conductive, a first power conveying path interconnecting said source terminals and said load terminals and including said power path of said first switch, a second power conveying path connected to said load terminals and including said power path of said second switch, a transformer having a primary winding means and a secondary winding means and a tertiary winding means, said transformer further including a magnetic material core having a hysteresis loop of substantially rectangular configuration linking said winding means, means connecting said secondary winding means to said control devices in such polarity that a flux change in said core in a first direction toward a first saturated condition of said core will actuate said control device of said first switch to render said power path of said first switch conductive and that a flux change in said core in a second direction toward a second saturated condition of said core will actuate said control device of said second switch to render said power path of said second switch conductive, a second pair of source terminals adapted to be energized with direct voltage, first and second valve devices, each said valve device having a power conveying path and a control path for controlling the initiation and termination of current flow through its said power path, a pair of current paths connecting said primary winding means to said second pair of source terminals, a first of said current paths including said power path of said first valve device and effective when conducting to change said flux in said first direction, a second of said current paths including said power path of said second valve device and effective when conducting to change said flux in said second direction, a pair of bias voltage producing devices, feedback means connecting said tertiary winding means to said control paths of said valve devices and including said bias devices, said feedback means being polarized such that a change in said flux in said first direction renders said control path of said first valve device effective to maintain its said power path conductive and a change in said flux in said second direction renders said control path of said second valve device effective to maintain its said power path conductive, a first of said bias devices being in circuit with said control path of said first valve device and effective to oppose actuation of its said control path, the second of said bias devices being in circuit with said control path of said second valve device and effective to oppose actuation of its said control path, the magnitude of the voltage of said bias devices being not less than the magnitude of the voltages induced in said tertiary winding means due to the change in flux in said core from the magnitude at said first saturated condition to the magnitude at a first remnance condition as a consequence of the termination of current flow through said first current path and from the magnitude at said second saturated condition to the magnitude at a second remnance condition as a consequence of the termination of current flow through said second current path, a source of spaced periodic electrical pulses of alternating polarity, and means connecting said last-named source to said control paths of said valve devices whereby said valve devices are alternately rendered conductive, said primary winding means being so related to the current flow through said current paths and to the flux required to saturate said core that the time required to change said flux from first remnance condition to said second saturated condition and from said second remnance condition to said first saturated condition is substantially less than the time interval between said spaced pulses.

References Cited by the Examiner

UNITED STATES PATENTS

| | | | |
|---|---|---|---|
| 2,785,236 | 3/1957 | Bright et al. | |
| 2,987,665 | 6/1961 | Thompson | 321—16 |
| 3,074,000 | 1/1963 | Salihi | 321—454 |
| 3,191,115 | 6/1965 | Lloyd | 321—45 |
| 3,219,906 | 11/1965 | Keller et al. | 321—45 |

JOHN F. COUCH, *Primary Examiner.*

LLOYD McCOLLUM, *Examiner.*

J. J. KISSANE, *Assistant Examiner.*